Figure 1:
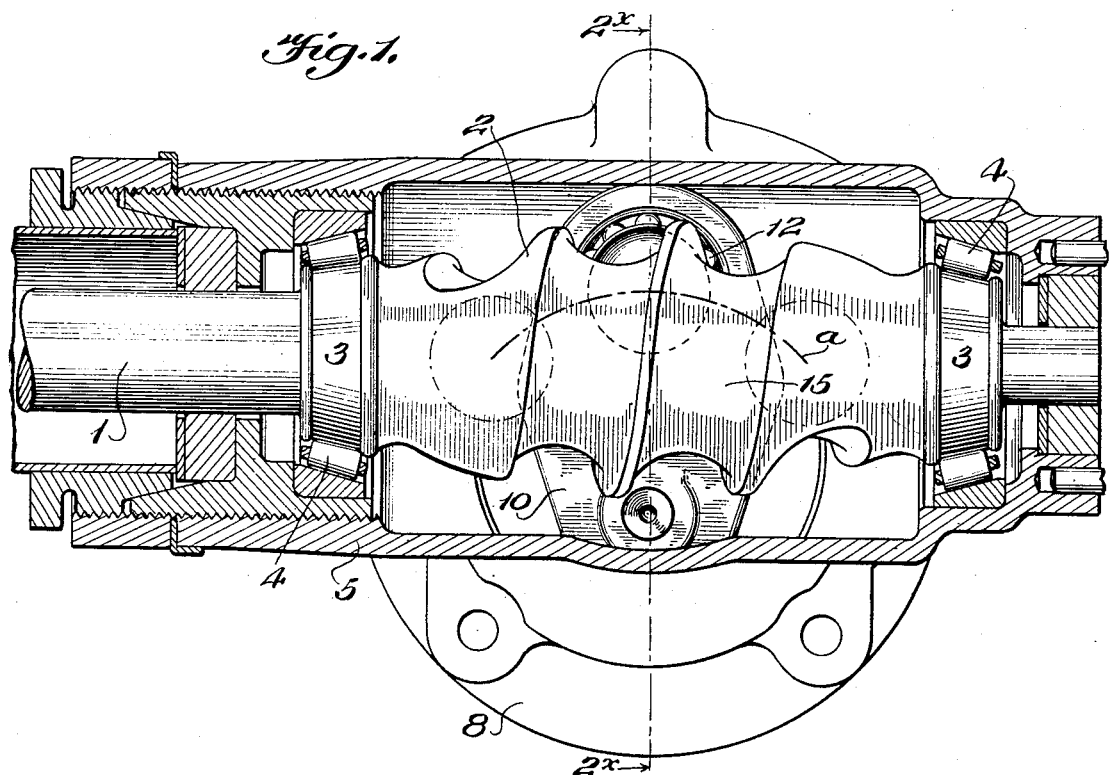

Aug. 20, 1929.  W. NOBLE  1,725,738

STEERING GEAR

Filed Aug. 11, 1928

Inventor
Warren Noble.
By Stanley Lightfoot
Attorney

Patented Aug. 20, 1929.

1,725,738

UNITED STATES PATENT OFFICE.

WARREN NOBLE, OF DETROIT, MICHIGAN.

STEERING GEAR.

Application filed August 11, 1928. Serial No. 298,899.

This invention relates to steering gears such as are used in automotive vehicles although it is applicable also as a motion transmitting means to other uses, and more particularly has reference to worm type gears wherein a driven shaft is operated through a rocking member by a worm or cam.

The object of the invention is to provide a construction which may be cheaply manufactured without sacrificing strength or efficiency and which will in operation readily respond to the effort applied to the steering wheel by a driver under all circumstances so that the steering will be faciliated in a highly desirable manner.

More particularly the invention has for its object to provide a steering gear wherein a driving worm, a driven shaft, and a worm engaging member carried by such shaft, are so constructed and arranged that the engaging member is swingable on an axis appreciably below the axis of the worm and in an arc appreciably above the axis of said worm, whereby a close approach of the worm to the arm carrying the engaging member is permitted with consequent compactness of arrangement, and a highly desirable form of arworm and manner of engagement of the member therewith may be secured.

A further object of the invention is to provide for a relieving movement of the engaging member in the groove of the worm for the absorption of road shock and also for the reducing of friction of the non-working face of the groove of the engaging member; and still further it is an object of the invention to provide for the adjustment of the resistance offered to the said relieving movement of the said engaging member.

It is also an object of the invention to provide an adjustable limiting stop for determining the extent of relieving movement of the said engaging member.

Still further the invention contemplates the provision of a worm, a driven shaft and a novel arrangement of bracket for the driven shaft and housing for the worm, resulting in an arrangement admitting of a very simple and accurate assembly involving a minimum of skill with an assurance of proper operating disposition of the parts when so assembled.

Still further objects and advantages subsidiary to or resulting from the aforesaid objects, or from the construction or operation of the invention as it may be carried into effect, will become apparent as the said invention is herein further disclosed.

In carrying the said invention into effect, I may provide on a steering column a worm or cam having the general form of an arc rotated about its chord, the thread of the worm following the general outline thereof whereby it more closely approaches the axis of the worm at its ends than at the center portion. A driven shaft is provided with an arm extending at right angles therefrom and carrying a worm engaging member in such a manner that it swings in an arc appreciably above the axis of the worm and substantially terminates in a plane parallel to the axis of the driven shaft through the axis of the worm, the axis of the said driven shaft being appreciably below the axis of the worm. The shaft is carried by a bracket to facilitate mounting on the frame of a vehicle, this bracket carrying a spring pressed abutment, which engages the back of the said arm, together with means for regulating the pressure of the spring and for determining the extent of movement of the said abutment. The worm carried by the steering column is enclosed in a housing which in turn is secured to the face of the bracket and in such position maintains the worm in its relationship to the engaging member.

Figure 2:
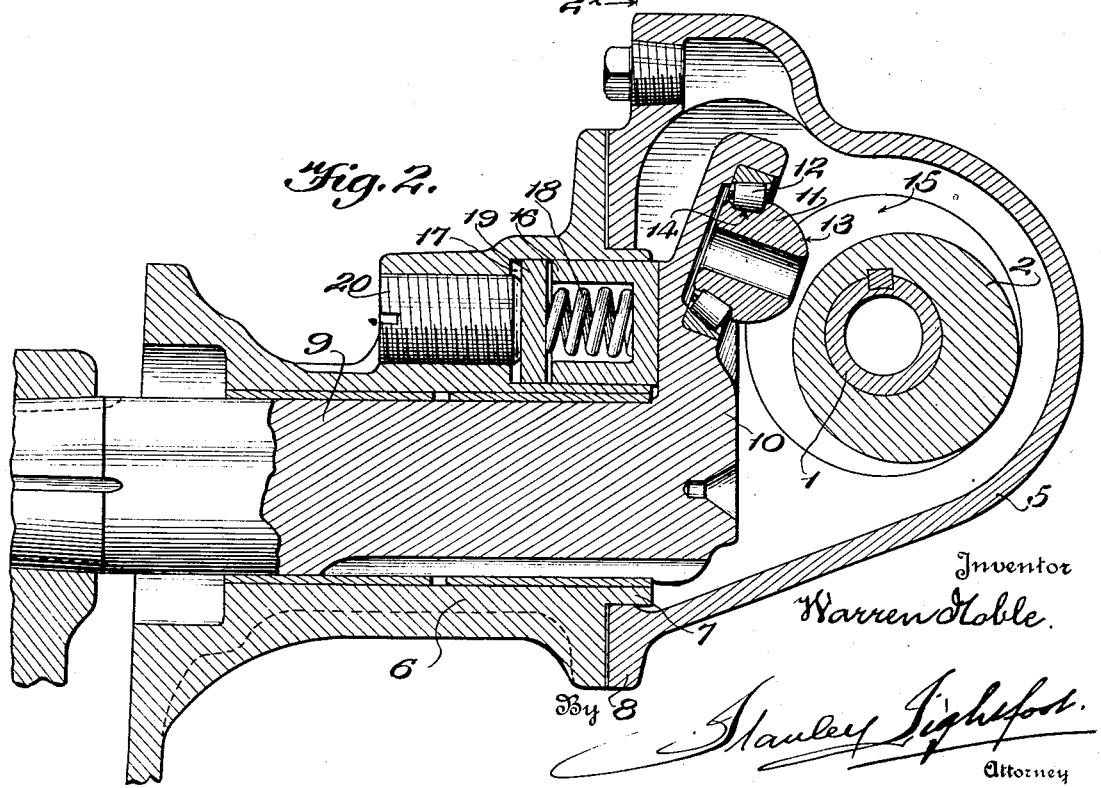

All of which is more particularly described and ascertained hereinafter, by way of example, having reference to the accompanying drawings wherein:

Figure 1 is an elevation of a steering gear with its casing shown in section in a plane through the axis of the steering column, and Figure 2 is a transverse section of the same taken on the line 2×—2× of Figure 1.

Similar characters indicate similar parts in both the figures of the drawing.

1 is the shaft of a steering column or gear-operating member on which is mounted the worm 2, the ends of which worm are tapered at 3 and are mounted in roller bearings 4 within a casing 5.

6 is a bracket piloted at 7 in one side of the said casing 5 which is flanged at 8 for suitable attachment to the said bracket, and in this bracket a driven shaft 9 is rotatably mounted, the inner end of the said shaft 9 being provided with an arm 10 extending at right angles therefrom and carrying in its free end a worm-engaging member 11 mounted in a roller bearing 12.

The said member 11 has a spherical face 13 and a tapered or conical stem 14 with which stem the said roller bearing 12 engages for rotary support of the said member 11. The axis of the said bearing 12 and of the member 11 is inclined relative to the axis of the shaft 9, as shown in Figure 2, so that the said axes converge to a point materially in advance of the inner end of the said shaft 9.

The worm engaging member 11 enters a coresponding thread 15 cut or formed in the worm 2. The position of the worm engaging member 11 relative to the axis of the shaft 9 and to the axis of the worm 2 is such that, in its swinging movement with the arm 10, it will describe an arc similar to that indicated by the broken line a, shown in Figure 1, with the ends of the said arc substantially terminating in the horizontal plane of the axis of the worm 2 as viewed in the position of the device illustrated in the drawing; and as a consequence of this movement, the said engaging member in its intermediate position, which is that shown on the drawing, is at a greater distance from the axis of the worm than when it is at one or other end of its arcuate travel.

Accordingly the groove of the worm is varied in depth relative to its axis in a manner corresponding to this variation of the position of the engaging member relative to the axis of the worm, so that the groove of the worm is deeper at its ends than at the central portion thereof. This gives to the worm a shape corresponding to the rotation of an arc about its chord, the diameter of the worm being greater at its intermediate part than at its ends so far as the groove is concerned.

Slight dimensional equalities of the worm groove, or a friction or shock relieving movement of the engaging member, is provided for by a spring pressed abutment 16 engaging the back of the arm 10 and housed in a recess 17 in the bracket 6; 18 being the spring urging the said abutment 16 in the direction of the worm 2, and 19 a washer engaging the inner end of the said spring and movable in said recess 17 under the influence of an adjustment screw 20.

It will be obvious that the adjustment of the said screw 20 in the bracket 6 will determine the amount of "give" or movement permitted the abutment 16 and thus determine the relief movement of the worm-engaging member 11 in the thread of the worm. This movement may be quite slight. For instance, it may be limited to five thousandths of an inch where the thread of the worm is at all accurate in contour and the strength of the spring 18 adequate to provide the required resistance to such relieving movement.

This invention may be developed within the scope of the following claims without departing from the essential features of the said invention and it is desired that the specification and drawing be read as being merely illustrative and not in a limiting sense except as necessitated by the prior art.

What I claim is:

1. In a device of the class described, a rotary driving shaft having a worm thereon, said worm having outwardly disposed cam faces, a transverse driven shaft having an arm thereon, a member on said arm engaging said worm, said member being urged outwardly by said cam faces, slightly yieldable means maintaining the engagement of said member with said worm, and means limiting the yielding movement of said yieldable means.

2. In a device of the class described, a rotary driving shaft having a worm thereon, said worm having outwardly disposed cam faces, a transverse driven shaft having an arm thereon, said driven shaft having slight end play, a member on said arm engaging said worm said member being outwardly urged by said cam faces, yieldable means operating to press the arm in the direction of said worm, and means limiting the extent of yielding of said yieldable means.

3. In a device of the class described, a rotary driving shaft having a worm thereon, a transverse driven shaft having an arm thereon, a worm engaging member guided by said arm and swinging about the axis of said driven shaft in an arc appreciably above the axis of said worm, the thread of said worm varying in depth in counterpart of the path of said engaging member, and slightly yieldable means urging said member in the direction of said worm.

4. In a device of the class described, a rotary driving shaft having a worm thereon, a transverse driven shaft having an arm thereon, a member on said arm engaging said worm, slightly yieldable means maintaining the engagement of said member with said worm, and adjustable means limiting the yielding movement of said yieldable means.

5. In a device of the class described, a rotary driving shaft having a worm thereon, a transverse driven shaft having an arm thereon, said driven shaft having slight end play, a member on said arm engaging said worm, yieldable means operating to press the arm in the direction of said worm, and adjustable means limiting the extent of yielding of said yieldable means.

6. In a device of the class described, a rotary driving shaft having a worm thereon, a transverse driven shaft having an arm thereon, a worm engaging member guided by said arm and swinging about the axis of said driven shaft in an arc appreciably above the axis of said worm, the thread of said worm varying in depth in counterpart of the path of said engaging member, yieldable means urging said member in the direction of said worm, and adjustable means limiting the extent of yielding of said yieldable means.

7. In a device of the class described, a barrel type worm having a contour substantially the development of an engaging member describing an arc appreciably above the axis of said worm and in a plane to one side of said axis.

8. In a device of the class described, a barrel type worm having a contour substantially the development of an engaging member describing an arc appreciably above and terminating substantially in alignment with the axis of said worm and in a plane to one side of said axis.

9. In a device of the class described, a rotary driving shaft having a worm thereon, a driven shaft terminating in the vicinity of said worm and having an arm thereon, a member on said arm having its axis angularly disposed to said driven shaft and in constant engagement with said worm and mounted to swing above the axis of the said driven shaft in a plane offset from the vertical plane containing the axis of said worm.

10. In a device of the class described, a rotary driving shaft having a worm thereon, a driven shaft having its inner end terminating short of said worm and having an arm on said inner end, an enclosing structure for said arm and said worm, means in said structure resiliently engaging the back of said arm to yieldably determine its position relative to said worm, stop means limiting the yielding of said last mentioned means, and a member engaging the back of said arm to determine its position relative to said worm, and a member extending from the face of said arm and in constant engagement with said worm.

11. In a device of the class described, a rotary driving shaft having a worm thereon, a driven shaft having an arm thereon, a worm-engaging member on said arm swingable about the axis of said driven shaft in an arc appreciably above the axis of said worm, said member being rotatable on an axis inclined towards the axis of said driven shaft and towards the axis of said worm.

12. In a device of the class described, a rotary driving shaft having a worm thereon, a driven shaft having an arm thereon, the free end of said arm being offset from the general plane of said arm to extend somewhat over said worm, and a worm-engaging member carried by the offset portion of the said arm and swingable in an arc appreciably above the axis of said worm.

13. In a device of the class described, a rotary driving shaft having a worm thereon, a driven shaft having an arm thereon, the free end of said arm being offset from the general plane of said arm to extend somewhat over said worm, and a worm-engaging member carried by the offset portion of the said arm and swingable in an arc appreciably above the axis of said worm with said arc terminating substantially in alignment with the axis of said worm.

In testimony whereof I affix my signature.

WARREN NOBLE.